US011869296B2

(12) United States Patent
Yokota et al.

(10) Patent No.: US 11,869,296 B2
(45) Date of Patent: Jan. 9, 2024

(54) EQUIPMENT CONTROLLING APPARATUS AND EQUIPMENT CONTROLLING METHOD

(71) Applicant: SONY GROUP CORPORATION, Tokyo (JP)

(72) Inventors: Makoto Yokota, Tokyo (JP); Takeshi Otani, Tokyo (JP); Michiko Toba, Tokyo (JP); Kazuha Yamamoto, Tokyo (JP); Hiroyuki Hida, Tokyo (JP); Takeo Kamei, Tokyo (JP); Shuhei Kikuchihara, Tokyo (JP); Shinya Kimura, Tokyo (JP); Ryohei Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 224 days.

(21) Appl. No.: 17/425,107

(22) PCT Filed: Jan. 31, 2019

(86) PCT No.: PCT/JP2019/003369
§ 371 (c)(1),
(2) Date: Jul. 22, 2021

(87) PCT Pub. No.: WO2020/157908
PCT Pub. Date: Aug. 6, 2020

(65) Prior Publication Data
US 2022/0108578 A1 Apr. 7, 2022

(51) Int. Cl.
*G07C 9/38* (2020.01)
*G07C 9/00* (2020.01)
(Continued)

(52) U.S. Cl.
CPC ........... *G07C 9/38* (2020.01); *G07C 9/00896* (2013.01); *G08B 13/08* (2013.01);
(Continued)

(58) Field of Classification Search
None
See application file for complete search history.

(56) References Cited

U.S. PATENT DOCUMENTS 7,764,179 B1 * 7/2010 Strawder ................ G16H 40/20
340/286.07
7,987,108 B2 * 7/2011 Wetzer ................. G06Q 10/087
372/86

(Continued)

FOREIGN PATENT DOCUMENTS

CA 2579081 A1 4/2008
CN 1801230 A 7/2006
(Continued)

OTHER PUBLICATIONS

International Search Report and Written Opinion of PCT Application No. PCT/JP2019/003369, dated Mar. 26, 2019, 10 pages of ISRWO.

*Primary Examiner* — K. Wong
(74) *Attorney, Agent, or Firm* — CHIP LAW GROUP

(57) ABSTRACT

Provided is an equipment controlling apparatus that includes a storage section that stores a time frame within which a setting of operation of a device disposed in a predetermined region is to be changed, and a control section that controls the device to change operation between a time frame set in advance in the storage section and a time frame different from the time frame.

13 Claims, 16 Drawing Sheets

(51) Int. Cl.
*G08B 13/08* (2006.01)
*G08B 13/196* (2006.01)

(52) U.S. Cl.
CPC . *G08B 13/19669* (2013.01); *G08B 13/19689* (2013.01); *G07C 2209/08* (2013.01)

(56) References Cited

U.S. PATENT DOCUMENTS

| | | | |
|---|---|---|---|
| 9,666,000 B1 * | 5/2017 | Schoenfelder | G07C 9/257 |
| 10,715,528 B1 * | 7/2020 | Leblang | H04W 4/02 |
| 2002/0057342 A1 * | 5/2002 | Yoshiyama | G08B 13/19695 |
| | | | 348/E7.086 |

FOREIGN PATENT DOCUMENTS

| | | |
|---|---|---|
| CN | 103902868 A | 7/2014 |
| CN | 107408316 A | 11/2017 |
| CN | 107798578 A | 3/2018 |
| JP | 2002-216278 A | 8/2002 |
| JP | 2006-203518 A | 8/2006 |
| JP | 2007-122480 A | 5/2007 |
| JP | 2018-042144 A | 3/2018 |
| JP | 2018101361 A | 6/2018 |
| JP | 2018-173847 A | 11/2018 |
| JP | 2018-190420 A | 11/2018 |
| WO | WO-2014081223 A1 | 5/2014 |
| WO | WO-2014203533 A1 | 12/2014 |
| WO | 2017/094149 A1 | 6/2017 |
| WO | WO2022/180097 A1 * | 9/2022 |

* cited by examiner

FIG. 9

| TIMELINE | | |
|---|---|---|
| 👤 | FATHER UNLOCKED HOME | 13:21 |
| 👤 | MOTHER UNLOCKED HOME | 15:51 |
| 👤 | MOTHER LOCKED HOME | 16:15 |
| 🧹 | SONY UNLOCKED HOME ACCORDING TO REQUEST FROM ENTERPRISER A | 17:01 |
| 🧹 | SONY LOCKED HOME ACCORDING TO REQUEST FROM ENTERPRISER A | 18:59 |

FIG. 10

| TIMELINE | | |
|---|---|---|
| 👤 | FATHER UNLOCKED HOME | 13:21 |
| 👤 | MOTHER UNLOCKED HOME | 15:51 |
| 👤 | MOTHER LOCKED HOME | 16:15 |
| 👤 | FATHER UNLOCKED HOME | 17:01 |
| 👤 | FATHER LOCKED HOME | 18:59 |

FIG. 13

LOCK OPEN/CLOSE SERVICE　　　　　　　　　　OPERATOR ID :xxxxxx [MENU] [LOGOUT]

LOCKING/UNLOCKING OPERATION

■ SEARCH CONDITIONS

| BUSINESS NAME | ▶ |
|---|---|
| OFFICE NAME | HEADQUARTERS OPERATIONS CENTER ▶ |
| BUSINESS CONTRACT NUMBER ※PARTIAL MATCH SEARCH | |
| CONTRACTOR NAME ※PARTIAL MATCH SEARCH | |
| DATE | yyyy/mm/dd 📅 ~ yyyy/mm/dd 📅 |
| INDICATION OF FINISHED SCHEDULE | ○ YES ● NO |

[SEARCH]　　　　　　　　　　　　　　　　　　　[SCHEDULE REGISTRATION]

■ SEARCH RESULT

| No. | OFFICE NAME | BUSINESS CONTRACT NUMBER | CONTRACTOR NAME | START DATE AND TIME | END DATE AND TIME | START OF WORK | UNLOCKING | LOCKING | STATE CHECK | END OF WORK | SCHEDULE EDIT |
|---|---|---|---|---|---|---|---|---|---|---|---|
| 1 | HEADQUARTERS OPERATIONS CENTER | keiyaku000001 | KOJI SATOH | 2018/10/5 10:30 | 2018/10/5 12:30 | [START] | 🔓 | 🔒 | [CHECK] | [END] | [EDIT] [DELETE] |
| 2 | HEADQUARTERS OPERATIONS CENTER | keiyaku016079 | TOSHIKO SUZUKI | 2018/10/5 11:15 | 2018/10/5 14:15 | [START] | 🔓 | 🔒 | [CHECK] | [END] | [EDIT] [DELETE] |
| 3 | HEADQUARTERS OPERATIONS CENTER | keiyaku000367 | YOSHIKI YAMADA | 2018/10/5 13:00 | 2018/10/5 15:00 | [START] | 🔓 | 🔒 | [CHECK] | [END] | [EDIT] [DELETE] |

FIG. 21

LOCK OPEN/CLOSE SERVICE     OPERATOR ID : xxxxxx   [MENU] [LOGOUT]

SCHEDULE CHANGE

ENTERPRISER
[ ENTERPRISER 1 ]

OFFICE
[ HEADQUARTERS OPERATIONS CENTER ]

BUSINESS CONTRACT NUMBER
[ keiyaku000001 ]

CONTRACTOR NAME
[ KOJI SATOH ]

START DATE    START TIME
[ 2018/10/5 ] 📅    [ 10 ▼ ]   [ 30 ▼ ]
                    HOUR    MINUTE

~

END DATE    END TIME
[ 2018/10/5 ] 📅    [ 12 ▼ ]   [ 30 ▼ ]
                    HOUR    MINUTE

[ REGISTRATION ]     [ RETURN TO LIST ]

FIG. 22

| LOCK OPEN/CLOSE SERVICE | OPERATOR ID : xxxxxx | MENU | LOGOUT |

SCHEDULE REGISTRATION

ENTERPRISER
[ ENTERPRISER 1 ]

OFFICE
[ HEADQUARTERS OPERATIONS CENTER ]

BUSINESS CONTRACT NUMBER
[ keiyaku000001 ]

START DATE  START TIME
[ yyyy/mm/dd ]  [ - ▶ ]  [ - ▶ ]
                HOUR    MINUTE

~

END DATE  END TIME
[ 2018/10/5 ]  [ - ▶ ]  [ - ▶ ]
                HOUR    MINUTE

[ REGISTRATION ]    [ RETURN TO LIST ]

EQUIPMENT CONTROLLING APPARATUS AND EQUIPMENT CONTROLLING METHOD

CROSS REFERENCE TO RELATED APPLICATIONS

This application is a U.S. National Phase of International Patent Application No. PCT/JP2019/003369 filed on Jan. 31, 2019. Each of the above-referenced applications is hereby incorporated herein by reference in its entirety.

TECHNICAL FIELD

The present disclosure relates to an equipment controlling apparatus, an equipment controlling method, and a computer program.

BACKGROUND ART

In recent years, introduction of a home security system has been spread as crime prevention and disaster prevention measures in ordinary households. The home security system is generally configured such that various types of sensors are installed at important positions in a house and that, if the sensors detect an abnormality such as an intrusion of a suspicious person into the home, then the sensors issue an alarm sound to notify the surroundings of the abnormality or to report the abnormality to a contracted security company. For example, PTL 1 discloses a technology relating to switching to a surveillance mode to monitor a home for an intrusion of a suspicious person into the home. Meanwhile, PTL 2 discloses a control system for a home appliance and describes a method of controlling the home appliance to enter a designated operating state when an absence mode is set, and controlling the home appliance to return to a state immediately before the establishment of the absence mode when the absence mode is cancelled.

CITATION LIST

Patent Literature

PTL 1

PCT Patent Publication No. WO2017/094149

PTL 2

Japanese Patent Laid-Open No. 2006-203518

SUMMARY

Technical Problem

In such a manner, a general home security system monitors a home for an intrusion of a suspicious person into a home. However, it is inconvenient if a person who is neither a family member nor a suspicious person, such as a worker of a housekeeping service who helps with household affairs in the absence of the family members, is determined as a suspicious person and is set as a surveillance target. It is, however, still important to set such a person as just described as a monitoring target to some degree.

Therefore, the present disclosure proposes a novel and improved equipment controlling apparatus, equipment controlling method, and computer program by which appropriate monitoring can be performed for such a person who is neither a family member nor a suspicious person.

Solution to Problem

According to the present disclosure, there is provided an equipment controlling apparatus including a storage section that stores a time frame within which a setting of operation of a device disposed in a predetermined region is to be changed, and a control section that controls the device to change operation between a time frame set in advance in the storage section and a time frame different from the time frame.

Further, according to the present disclosure, there is provided an equipment controlling method including allowing storage of a time frame within which a setting of operation of a device disposed in a predetermined region is to be changed, and controlling the device to change operation between a time frame set in advance in the storage section and a time frame different from the time frame.

Furthermore, according to the present disclosure, there is provided a computer program causing a computer to execute allowing storage of a time frame within which a setting of operation of a device disposed in a predetermined region is to be changed, and controlling the device to change operation between a time frame set in advance in the storage section and a time frame different from the time frame.

BRIEF DESCRIPTION OF DRAWINGS

FIG. 9 is an explanatory view depicting an example of a user interface displayed on the portable terminal 11 of the user 10.

FIG. 10 is an explanatory view depicting an example of a user interface displayed on the portable terminal 11 of the user 10.

FIG. 13 is an explanatory view depicting an example of a user interface.

FIG. 21 is an explanatory view depicting an example of a user interface.

FIG. 22 is an explanatory view depicting an example of a user interface.

DESCRIPTION OF EMBODIMENT

In the following, a preferred embodiment of the present disclosure is described in detail with reference to the accompanying drawings. It is to be noted that, in the present specification and the drawings, components having substantially identical functional configurations are denoted by the same reference sign and that overlapping description thereof is omitted.

It is to be noted that the description is given in the following order.

1. Embodiment of Present Disclosure 1.1. Example of Configuration
1.2. Example of Operation 2. Summary 1. Embodiment of Present Disclosure
1.1. Example of Configuration First, a general configuration of a smart home system according to the embodiment of the present disclosure is described with reference to FIG. 1. The smart home system according to the embodiment of the present disclosure includes a smart lock system that can remotely perform locking and unlocking of a door of an entrance of a home. Further, the smart home system according to the embodiment of the present disclosure includes a camera that monitors a state in the home. Furthermore, the smart home system according to the embodiment of the present disclosure includes a sensor that detects whether a window of the home is opened.

Figure 1:
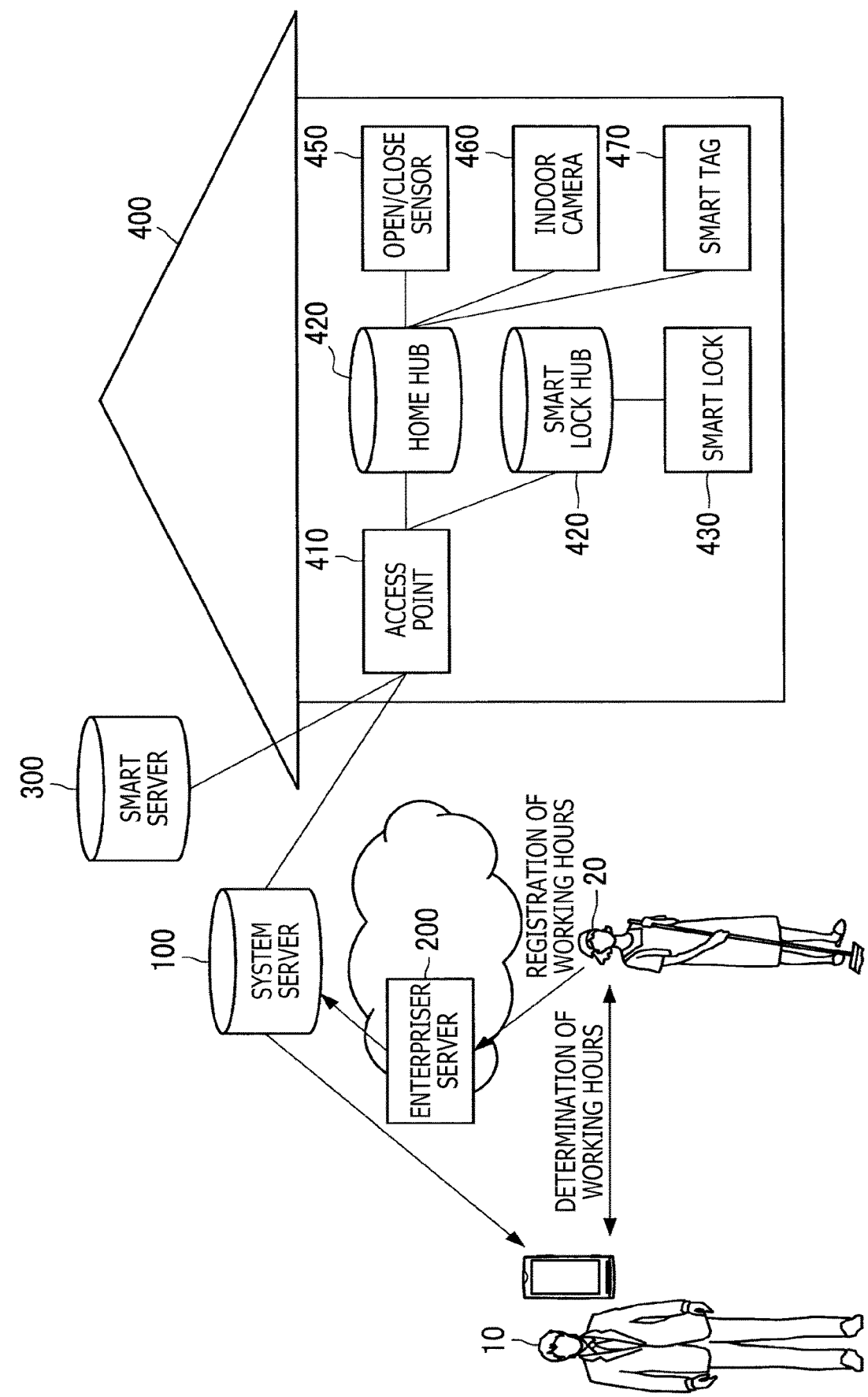
FIG. 1 is an explanatory view illustrating a general configuration of a smart home system according to an embodiment of the present disclosure.

As depicted in FIG. 1, the smart home system according to the embodiment of the present disclosure includes a system server 100, an enterpriser server 200, and a smart server 300. Further, the smart home system according to the embodiment of the present disclosure is configured such that a home 400 of a user 10 includes an access point 410, a smart lock hub 420, a smart lock 430, a home hub 440, an open/close sensor 450, an indoor camera 460, and a smart tag 470.

The system server 100 is a server for controlling the entire smart home system according to the present embodiment. The system server 100 can function as an example of the equipment controlling apparatus of the present disclosure.

The system server 100 cooperates with the enterpriser server 200 and the smart server 300 to perform control of locking and unlocking of the smart lock 430 of the home 400, control of operation of the open/close sensor 450 and the indoor camera 460 for a window and a door, and other necessary control.

It is to be noted that the smart lock 430 provided in the home 400 is a lock that is installed at the entrance and that can be locked and unlocked remotely. The smart lock 430 permits only a user registered in advance to give an instruction for locking and unlocking thereto. However, in the present embodiment, opening and closing of the smart lock 430 are also permitted according to a request from an enterpriser in order to allow a person who is permitted to enter the home 400, such as a worker of a housekeeping service, to enter the home 400 in a state in which nobody is present in the home 400.

Further, the home hub 440 is connected to the open/close sensor 450, the indoor camera 460, and the smart tag 470 by a LAN (Local Area Network) in the home.

The system server 100 has a function of changing the mode according to a state of the home 400 in cooperation with the smart server 300. For example, the system server 100 sets the mode to a normal mode in a case where one or more users are present in the home 400, sets the mode to a surveillance mode in a case where nobody is present in the home 400, or sets the mode to some other modes.

In the present embodiment, if the smart lock 430 is unlocked or the open/close sensor 450 for a window or a door is operated in the surveillance mode, then the mode transitions to an abnormal mode. For example, if the open/close sensor 450 for a window or a door detects opening of the window in the surveillance mode, then the home hub 440 issues an alarm. By issuing the alarm from the home hub 440, the surroundings can be notified of the occurrence of an abnormality.

In the present embodiment, in addition to the modes mentioned above, a mode is prepared that is used for a case where a person who is neither a family member nor a suspicious person, such as a worker of a housekeeping service, enters the home 400. For example, such a mode as just described is hereinafter referred to as a "working mode." When the mode of the home 400 is the working mode, the system server 100 cooperates with the smart server 300 to control operation of a device of the home 400.

The enterpriser server 200 is a server that is owned, for example, by an enterpriser of a housekeeping service with whom the user 10 has a contract. The enterpriser server 200 operates in cooperation with the system server 100. The enterpriser server 200 registers visit date and time of a worker 20 of the housekeeping service in advance and transmits information of the worker 20 and information of the visit date and time to the system server 100 before the visit date.

Then, if the worker 20 of the housekeeping service visits the home 400 of the user 10 on the visit date to perform work and then the worker 20 requests an operator of the enterpriser to unlock the home 400, the enterpriser server 200 transmits an unlocking request to the system server 100 on the basis of the operation of the operator. Consequently, the worker 20 of the housekeeping service can enter the home 400 in order to perform work.

The smart server 300 controls operation of each device installed in the home 400 of the user 10. For example, the smart server 300 remotely executes locking and unlocking of the smart lock 430 on the basis of an operation of a portable terminal 11 owned by the user 10. Further, for example, when the worker 20 of the housekeeping service is to enter the home 400, the smart server 300 remotely executes unlocking and locking of the smart lock 430 according to the unlocking request from the system server 100.

It is to be noted that, while the system server 100, the enterpriser server 200, and the smart server 300 in FIG. 1 are depicted as servers different from each other, the present disclosure is not limited to such an example as just described. Any of the servers or all of the servers may be put together to the same server.

The example of the general configuration of the smart home system according to the embodiment of the present disclosure has been described with reference to FIG. 1. Now, an example of a functional configuration of the system server 100 according to the embodiment of the present disclosure is described.

Figure 2:
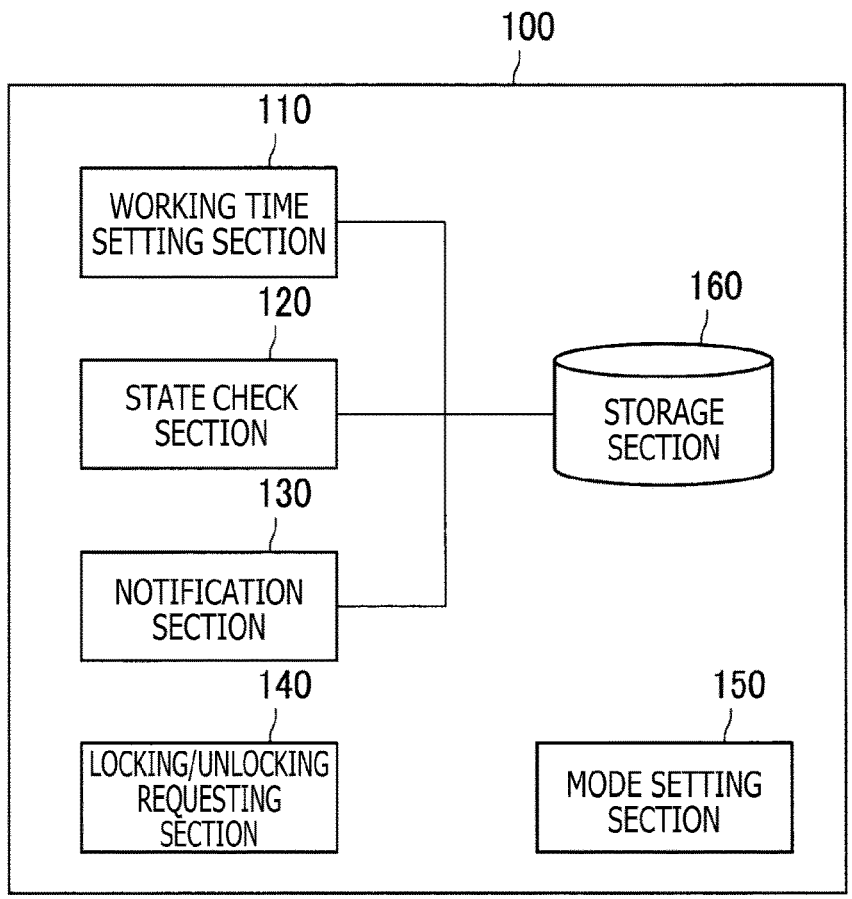
FIG. 2 is an explanatory view depicting an example of a functional configuration of a system server 100 according to the embodiment of the present disclosure.

FIG. 2 is an explanatory view depicting an example of a functional configuration of the system server 100 according to the embodiment of the present disclosure. In the following, the example of the functional configuration of the system server 100 according to the embodiment of the present disclosure is described with reference to FIG. 2.

As depicted in FIG. 2, the system server 100 according to the embodiment of the present disclosure includes a working time setting section 110, a state check section 120, a notification section 130, a locking/unlocking requesting section 140, a mode setting section 150, and a storage section 160.

The working time setting section 110 has a function of acquiring information of a worker of a housekeeping service and information of working time of the worker from the enterpriser server 200 and setting the information to the storage section 160. Since the working time setting section 110 sets the information of the worker of the housekeeping service and the information of the working time of the worker to the storage section 160, the information of the working time of the worker can be shared between the enterpriser of the housekeeping service and the system server 100.

The state check section 120 has a function of checking a state of the devices installed in the home 400. For example, the state check section 120 can check whether the smart lock 430 is installed correctly in the home 400.

The notification section 130 has a function of notifying the portable terminal 11 owned by the user 10 of various kinds of information. As an example of the information to be notified by the notification section 130, for example, information regarding a visit schedule of a worker of the housekeeping service, an entry of the worker into the home 400, an exit from the home 400, and so forth may be available.

The locking/unlocking requesting section 140 has a function of acquiring, from the enterpriser server 200, an unlocking request to allow a worker of a housekeeping service to enter the home 400 or a locking request that is made when the worker of the housekeeping service is to leave the home 400, and requesting the smart server 300 to unlock and lock the home 400. When the locking/unlocking requesting section 140 is to transmit an unlocking request to the smart server 300, the locking/unlocking requesting section 140 refers to the information of the working time set to the storage section 160 in advance and check whether the worker visits the home 400 at correct working time, whether the visitor is the correct worker, and so forth. In a case where the worker visits the home 400 at the correct working time and the visitor is the correct worker, the locking/unlocking requesting section 140 transmits an unlocking request to the smart server 300.

The mode setting section 150 has a function of setting a mode for the home 400 on the basis of a state of the devices of the home 400 or setting a mode for the home 400 on the basis of a designation of the user 10. Further, the mode setting section 150 has a function of controlling operation of each device of the home 400 and instructing the smart server 300 to perform control through the smart lock hub 420 or the home hub 440 according to the set mode.

For example, if a worker of a housekeeping service enters the home 400, then the mode of the home 400 transitions to the working mode. Usually, in the normal mode in which a family member is present in the home 400, the indoor camera 460 installed in the home does not perform an image capturing process (an image capturing process of capturing a still picture at every predetermined interval or an image capturing process of capturing a moving image). However, in the working mode, the indoor camera 460 installed in the home 400 executes the image capturing process.

In particular, although the situation is common in which a human being is present in the home 400 in the normal mode and the working mode, the person who is present in the home 400 is a family member in the normal mode, but the person who is present in the home 400 is a worker of a housekeeping service in the working mode. In particular, in the present embodiment, a mode is prepared in which a person who is neither a family member nor a suspicious person, such as a worker of a housekeeping service who performs a housework when family members are absent at home, is set as a monitoring target to some degree.

In the present embodiment, when time set in advance comes or, for example, when time that is scheduled for a worker of a housekeeping service to start working comes, the mode setting section 150 enters the working mode and controls operation of each device of the home 400 on the basis of rules in the working mode. Then, when time set in advance comes or, for example, when time that is scheduled for the worker of the housekeeping service to finish working comes, the mode setting section 150 cancels the working mode, returns to a mode before the transition to the working mode, and controls operation of each device of the home 400 on the basis of rules in the mode. As described above, the mode setting section 150 can function as an example of the control section of the present disclosure.

The storage section 160 stores various kinds of information to be used in the smart home system according to the present embodiment. For example, the storage section 160 stores information of a worker of a housekeeping service and information of working time of the worker.

Since the system server 100 according to the embodiment of the present disclosure has such a configuration as described above, it is possible to perform appropriate monitoring for a person who is neither a family member nor a suspicious person, such as a worker of a housekeeping service.

The example of the functional configuration of the system server 100 according to the embodiment of the present disclosure has been described. Now, an example of operation of the smart home system according to the embodiment of the present disclosure is described.

1.2. Example of Operation

As described above, as the modes of the home 400, the smart home system according to the embodiment of the present disclosure has four modes, that is, the normal mode, the surveillance mode, the working mode, and the abnormal mode. Here, transition between the respective modes is described.

Figure 3:
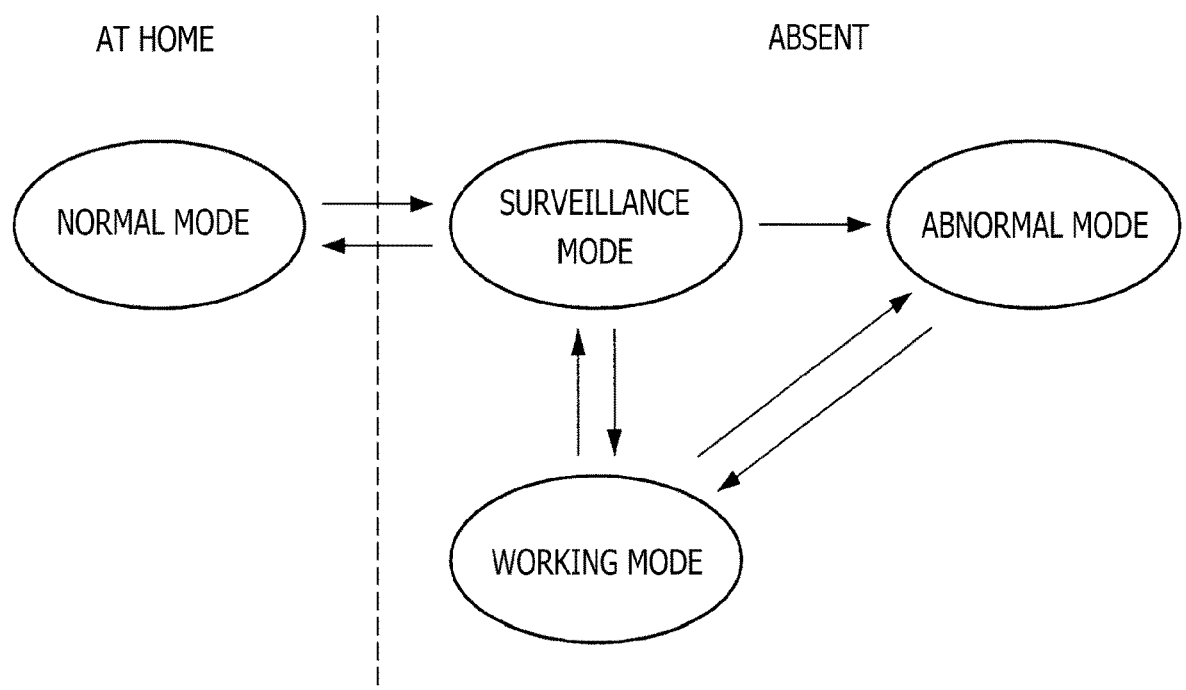
FIG. 3 is an explanatory view depicting modes of a home 400 in the smart home system according to the embodiment of the present disclosure.

FIG. 3 is an explanatory view depicting the modes of the home 400 in the smart home system according to the embodiment of the present disclosure.

The modes of the home 400 are divided into two types depending upon whether or not a family member is present in the home 400. In a case where a family member is present in the home 400, the mode of the home 400 is the normal mode. If all family members leave the home 400, then the mode of the home 400 transitions from the normal mode to the surveillance mode automatically or according to an operation of the user 10. If one of family members returns to the home 400, then the mode of the home 400 transitions from the surveillance mode to the normal mode automatically or according to an operation of the user 10.

For example, if detection is made by the open/close sensor 450 for the window in a state in which the mode of the home 400 is the surveillance mode, then the mode of the home 400 transitions to the abnormal mode. When the mode of the home 400 changes to the abnormal mode, for example, an alarm device such as the home hub 440 issues an alarm sound, or a notification is given to a contracted security company. Consequently, it becomes possible to notify the surroundings or the security company of an intrusion of a suspicious person into the home 400.

On the other hand, if a person who is neither a family member nor a suspicious person, such as a worker of a housekeeping service, enters the home 400 in a state in which the mode of the home 400 is the surveillance mode, then the mode of the home 400 transitions to the working mode. If the worker completes the work, then the mode of the home 400 returns to the surveillance mode. It is to be noted that, in a case where the home 400 is in the working mode, if the smart tag 470 or the open/close sensor installed at a door of a room detects that the worker enters the room into which an entry of the worker is not desirable, then the mode of the home 400 may transition to the abnormal mode.

It is to be noted that, after the worker enters the home 400, the worker manually locks the smart lock 430.

Now, a particular example of operation is described. First, it is assumed that the user 10 applies for a housekeeping service in advance and has a registration for a service for allowing the enterpriser of the housekeeping service to lock and unlock the smart lock 430 of the home 400. By sharing the contract information of the user 10 (for example, information of a contractor ID, name, and so forth) between the enterpriser server 200 and the system server 100, the enterpriser of the housekeeping service is placed into a state in which the enterpriser can make a request for locking and unlocking of the smart lock 430 of the home 400.

Figure 4:
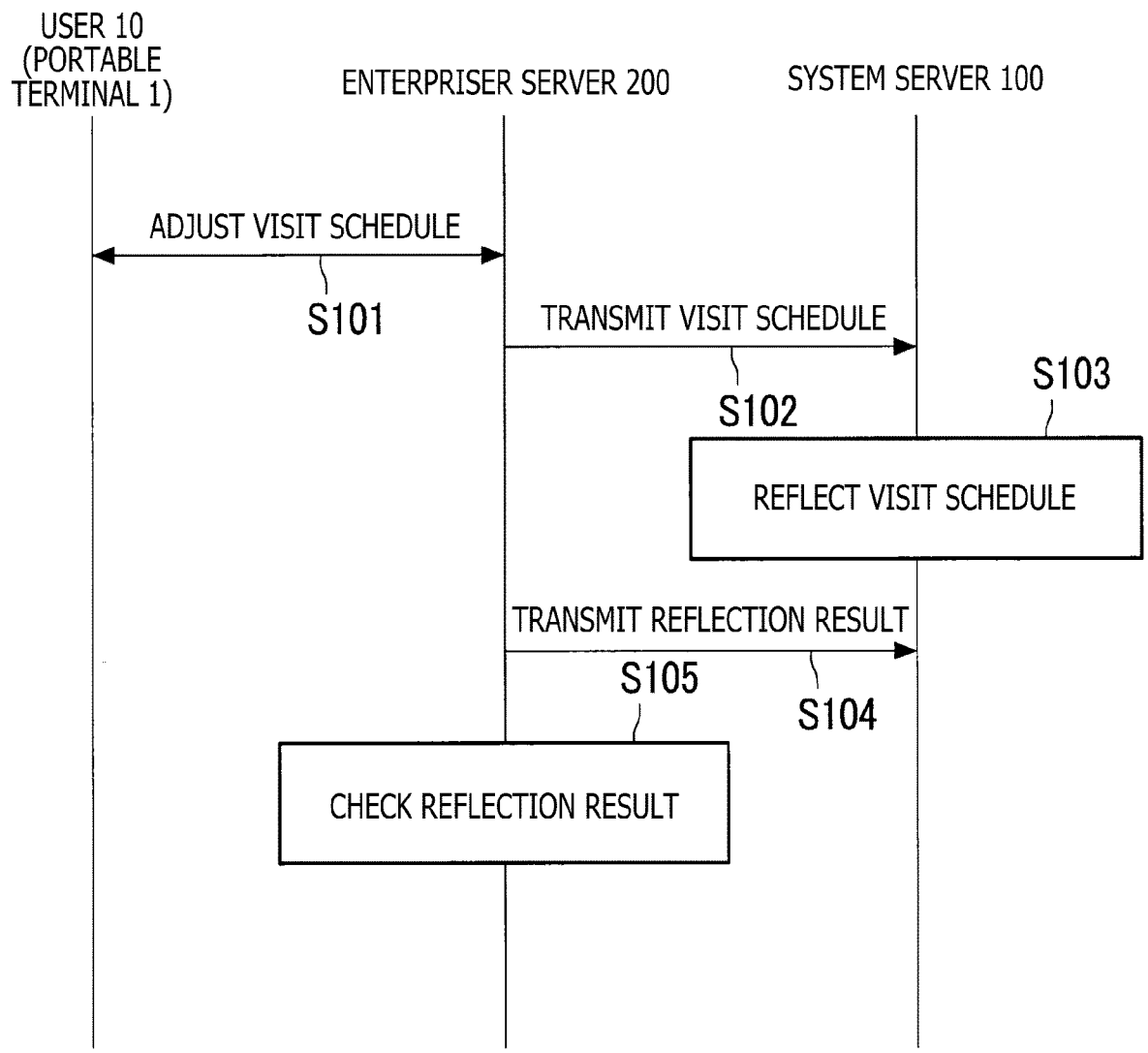
FIG. 4 is a flow diagram depicting an example of operation of the smart home system according to the embodiment of the present disclosure.

Now, a flow of processes performed when the user 10 adjusts a visit schedule of a worker with the enterpriser of the housekeeping service and registers the visit schedule into the system server 100 is described. FIG. 4 is a flow diagram depicting an example of operation of the smart home system according to the embodiment of the present disclosure. Depicted in FIG. 4 is an example of operation performed when the user 10 adjusts a visit schedule of a worker with an enterpriser of a housekeeping service and registers the visit schedule into the system server 100.

The user 10 adjusts a visit schedule of the worker with the enterpriser of the housekeeping service. In the example of FIG. 4, the user 10 registers the visit schedule of the worker adjusted suitably, into the enterpriser server 200 by using the portable terminal 11 (step S101).

When the visit schedule of the worker is registered, the enterpriser server 200 transmits information of the visit schedule to the system server 100 (step S102). The information of the visit schedule can include, for example, an enterpriser contract number, an office code, a process type (registration, change, and deletion), visit schedule information, and so forth. The information of the visit schedule may be transmitted, for example, in the CSV (Comma-Separated Values) format from the enterpriser server 200.

When the system server 100 receives the information of the visit schedule from the enterpriser server 200, the system server 100 causes the received information of the visit schedule to be reflected on the storage section 160 (step S103). The information of the visit schedule may be reflected immediately or may be reflected in a batch process. Then, the system server 100 transmits information of a result of the reflection to the enterpriser server 200 (step S104). The enterpriser of the housekeeping service refers to the enterpriser server 200 to check the result of the reflection transmitted to the enterpriser server 200 (step S105).

Figure 5:
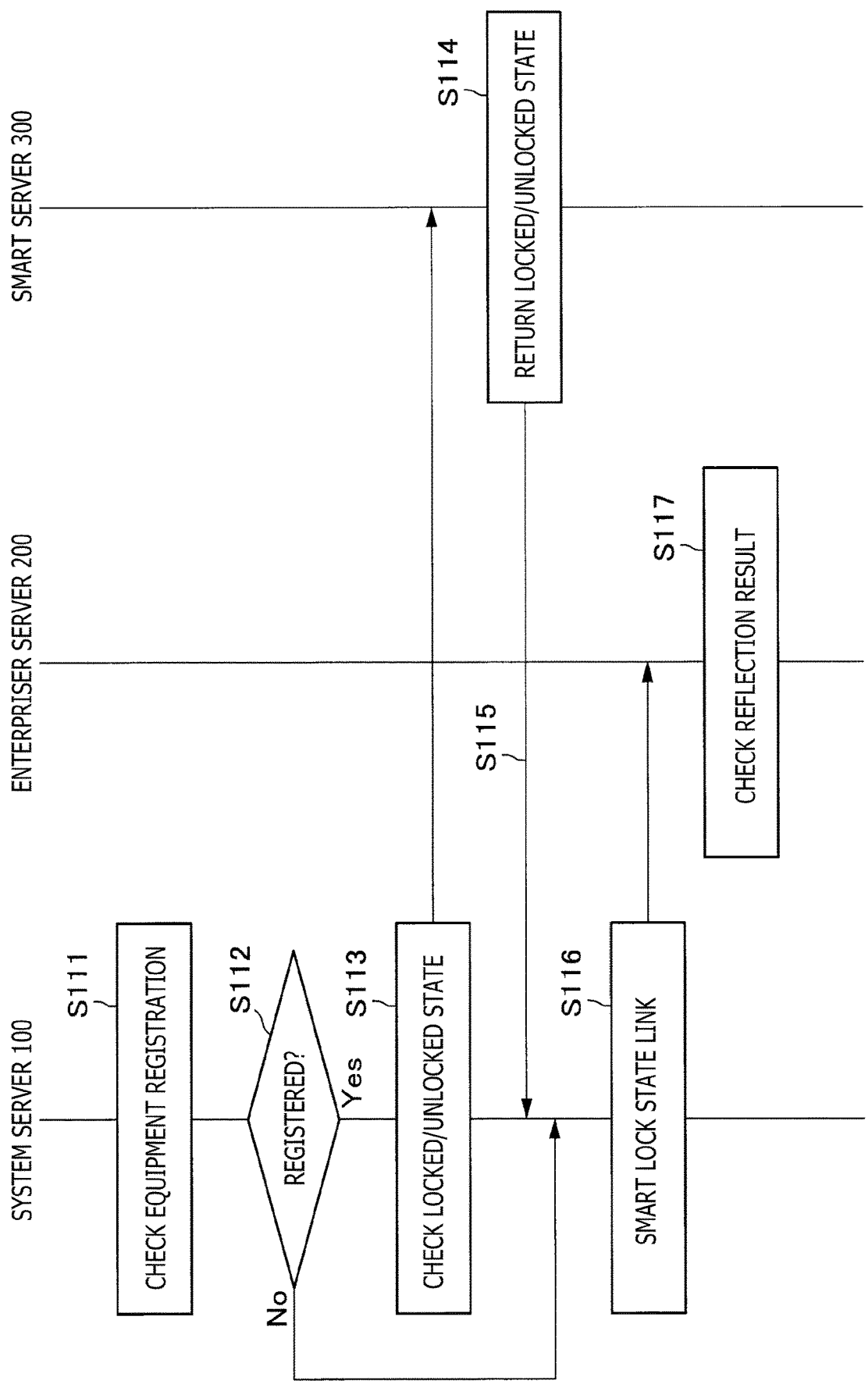
FIG. 5 is a flow diagram depicting an example of operation of the smart home system according to the embodiment of the present disclosure.

Now, a flow of processes performed when the system server 100 checks an installation situation of the smart lock 430 of the user 10 is described. If the smart lock 430 is not installed correctly in the home 400 of the user 10 in advance, even when the worker of the housekeeping service visits the home 400, the worker cannot enter the home 400. Therefore, the system server 100 checks an installation situation of the smart lock 430 of the user 10 in advance. FIG. 5 is a flow diagram depicting an example of operation of the smart home system according to the embodiment of the present disclosure. Depicted in FIG. 5 is an example of operation performed when the system server 100 checks an installation situation of the smart lock 430 of the user 10.

The system server 100 first checks whether information of the smart lock 430 of the user 10 is registered in the storage section 160 (step S111). This check may be executed at a fixed point of time every day, for example, by the state check section 120.

Then, as a result of the checking process in step S111, the system server 100 determines whether the information of the smart lock 430 of the user 10 is registered in the storage section 160 (step S112). This determination can be executed, for example, by the state check section 120.

If the information of the smart lock 430 of the user 10 is registered in the storage section 160 (step S112, Yes), then the system server 100 requests the smart server 300 to check a locked/unlocked state of the smart lock 430 of the user 10 (step S113). The request process to check the locked/unlocked state can be executed, for example, by the locking/unlocking requesting section 140.

When the smart server 300 receives the request to check the locked/unlocked state, the smart server 300 checks the locked/unlocked state of the smart lock 430 and returns the locked/unlocked state to the system server 100 (step S114). The system server 100 receives the locked/unlocked state sent from the smart server 300 (step S115).

In a case where the locked/unlocked state is returned or where information of the smart lock 430 of the user 10 is not registered in the storage section 160 (step S112, No), the system server 100 transmits information regarding a state of the smart lock 430 to the enterpriser server 200 in order to link the state of the smart lock 430 of the user 10 to the enterpriser server 200 (step S116). Only the state of the smart lock 430 of the user 10 whose information is not registered in the storage section 160 may be linked. The information regarding the state of the smart lock 430 may be transmitted, for example, in the CSV format from the enterpriser server 200.

The enterpriser server 200 receives the information regarding the state of the smart lock 430 and causes the information to be reflected in the inside of the enterpriser server 200. The enterpriser refers to the enterpriser server 200 to check a result reflected in the inside of the enterpriser server 200 (step S117). If the information of the smart lock 430 of the user 10 is not registered in the storage section 160, then the enterpriser of the housekeeping service requests the user 10 to install the smart lock 430 and to register the information of the smart lock 430 into the system server 100.

Figure 6:
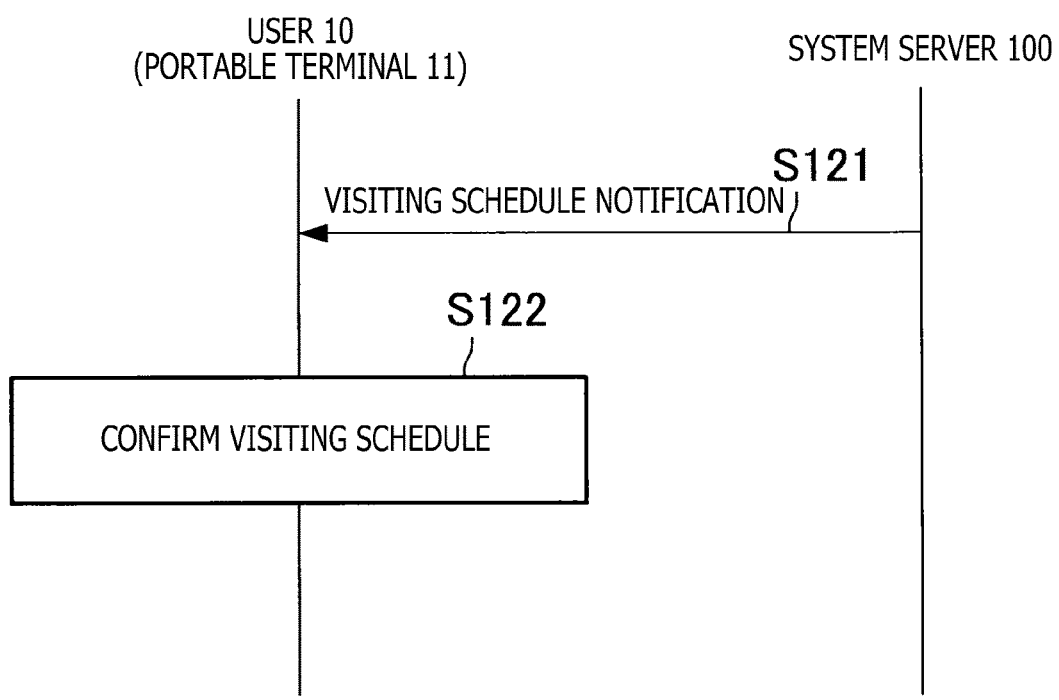
FIG. 6 is a flow diagram depicting an example of operation of the smart home system according to the embodiment of the present disclosure.

Subsequently, a flow of processes performed when the system server 100 allows the user 10 to confirm a visit of a worker of a housekeeping service in advance is described. FIG. 6 is a flow diagram depicting an example of operation of the smart home system according to the embodiment of the present disclosure. Depicted in FIG. 6 is an example of operation performed when the system server 100 allows the user 10 to confirm a visit of a worker of the housekeeping service in advance.

The system server 100 notifies the portable terminal 11 of the user 10 of information of a visit schedule of the worker, for example, on the day before the scheduled visit date of the worker of the housekeeping service (step S121). This notification process can be executed, for example, by the notification section 130. The user confirms the information of the visit schedule of the worker the notification of which is received by the portable terminal 11 (step S122). The user 10 waits until the visit date without making corrections if the visit schedule is correct. In a case where the visit schedule is wrong or the schedule changes, the user 10 can send an enquiry to the enterpriser of the housekeeping service.

Figure 7:
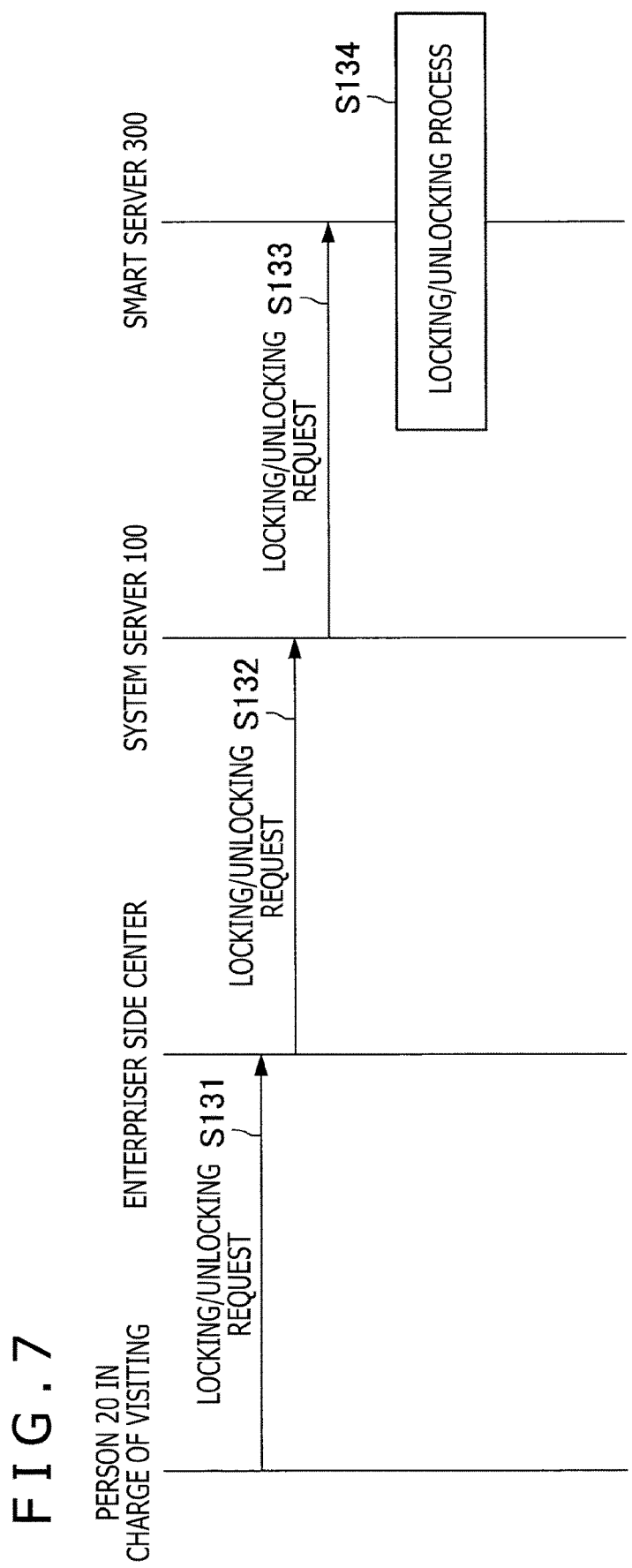
FIG. 7 is a flow diagram depicting an example of operation of the smart home system according to the embodiment of the present disclosure.

Now, an example of operation performed on the day of the visit of the worker of the housekeeping service is described. FIG. 7 is a flow diagram depicting an example of operation of the smart home system according to the embodiment of the present disclosure. Depicted in FIG. 7 is an example of operation performed on the day of the visit of the worker of the housekeeping service.

When the worker 20 of the housekeeping service arrives at the home 400 of the user 10 on the date and time scheduled to visit the home of the user 10, the worker 20 requests a center of the enterpriser side to unlock the smart lock 430 of the home 400 (step S131). Otherwise, when the worker 20 finishes the scheduled work, the worker 20 requests the center of the enterpriser side to lock the smart lock 430 of the home 400.

When the center of the enterpriser side receives the unlocking request or the locking request from the worker 20 of the housekeeping service, the center confirms the identity of the worker 20 and then transmits a request to unlock or lock the smart lock 430 of the home 400, to the system server 100 (step S132).

The system server 100 that has received the request to unlock or lock the smart lock 430 of the home 400 from the center of the enterpriser side transmits the request to unlock or lock the smart lock 430 of the home 400 to the smart server 300 (step S133).

The smart server 300 that has received the request to unlock or lock the smart lock 430 of the home 400 from the system server 100 executes a process of unlocking or locking the smart lock 430 of the home 400 on the basis of the received request (step S134).

Consequently, the worker 20 of the housekeeping service is enabled to enter or leave the home 400 of the user 10 from whom the request for the service has been received.

When the smart lock 430 of the home 400 is unlocked and the worker 20 of the housekeeping service enters the home 400 of the user 10, the mode of the home 400 transitions to the working mode. In the working mode, the indoor camera 460 may execute the image capturing process as described above. When the user at a remote place or the enterpriser of the housekeeping service is to check the state of the worker, data stored in a storage medium inserted in the indoor camera 460 is referred to. In order for the user or the enterpriser of the housekeeping service to see the situation of the worker at a remote place, the indoor camera 460 may upload recorded data to a cloud system on a network.

Now, examples of a user interface displayed on the portable terminal 11 of the user 10 in the smart home system according to the embodiment of the present disclosure are described.

Figure 8:
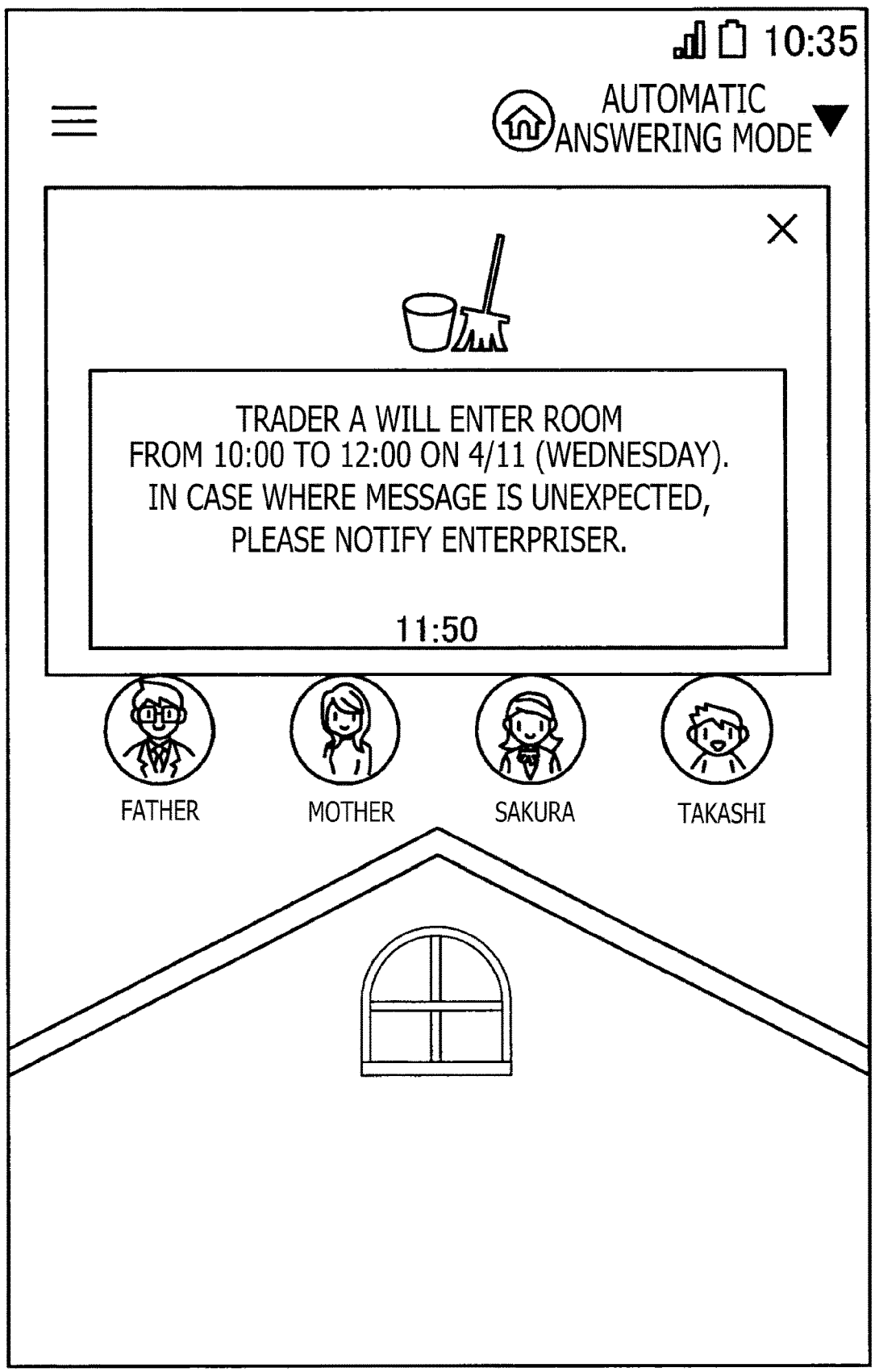
FIG. 8 is an explanatory view depicting an example of a user interface displayed on a portable terminal 11 of a user 10.

FIG. 8 is an explanatory view depicting an example of a user interface displayed on the portable terminal 11 of the user 10. Depicted in FIG. 8 is an example of a user interface that indicates a visit schedule of a worker of a housekeeping service the notification of which is given from the system server 100 to the portable terminal 11 in step S121 of FIG. 6. By displaying such a message on the portable terminal 11, the user 10 can confirm the visit schedule of the worker of the housekeeping service.

FIGS. 9 and 10 are explanatory views depicting examples of a user interface displayed on the portable terminal 11 of the user 10. Depicted in FIG. 9 is an example of a user interface that displays, in time series, a state of unlocking and locking of the smart lock 430 in the smart home system according to the embodiment of the present disclosure. Depicted in FIG. 10 is an example of a user interface that displays, in time series, a state of unlocking and locking of the smart lock 430 in an unlocking and locking system of the smart lock 430 according to the embodiment of the present disclosure.

In the example of FIG. 9, it is displayed that SONY unlocked the smart lock 430 of the home at 17:01 according to a request from an enterpriser A and that SONY locked the smart lock 430 of the home at 18:59 according to a request from the enterpriser A. On the other hand, in the example of FIG. 10, it is displayed that a father unlocked the smart lock 430 of the home at 17:01 according to a request from the enterpriser A and that the father locked the smart lock 430 of the home at 18:59 according to a request from the enterpriser A.

In such a manner, the smart home system according to the embodiment of the present disclosure can changeably display who has performed unlocking or locking of the smart lock 430 of the home.

Figure 11:
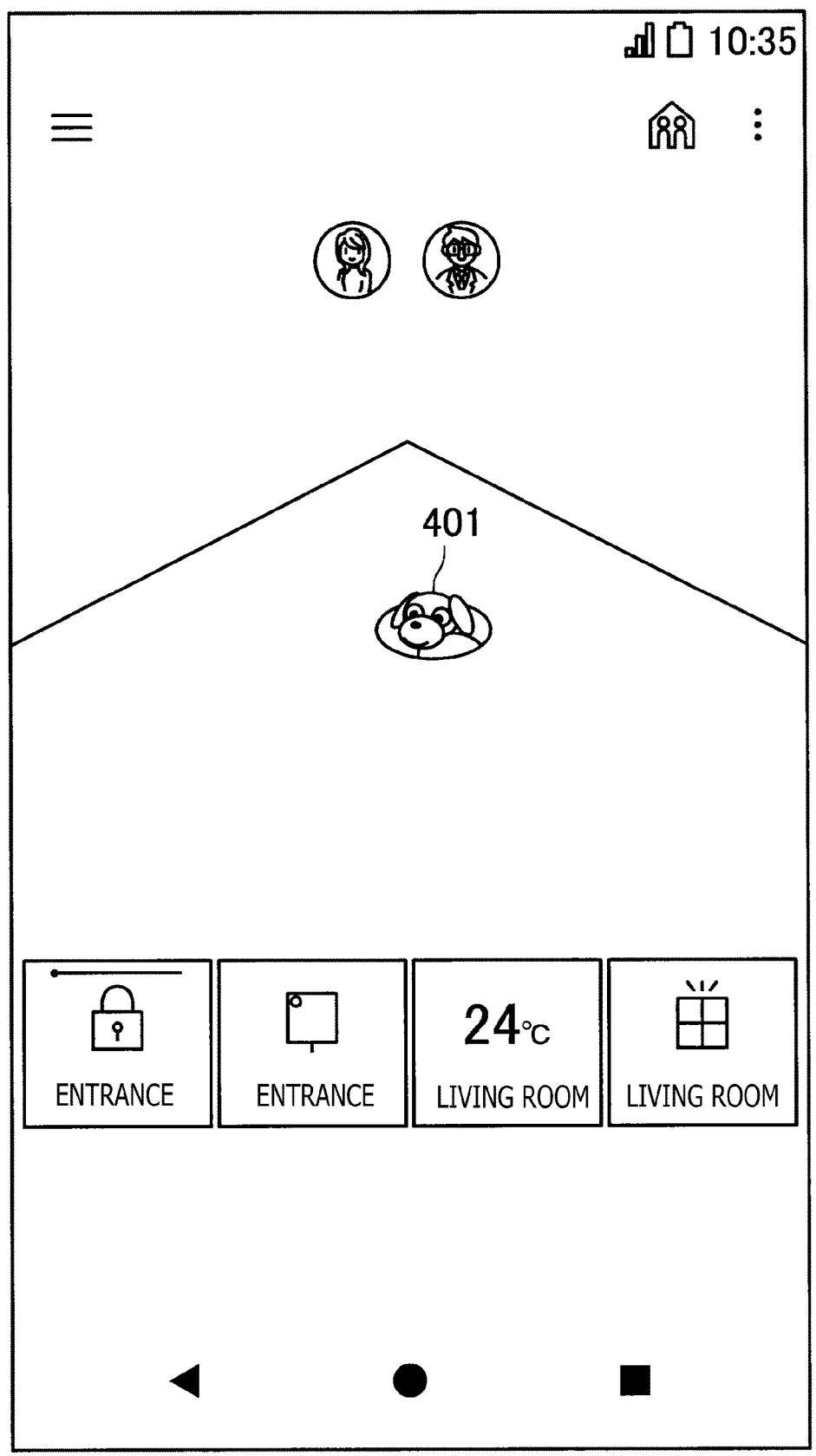
FIG. 11 is an explanatory view depicting an example of a user interface displayed on the portable terminal 11 of the user 10.

FIG. 11 is an explanatory view depicting an example of a user interface displayed on the portable terminal 11 of the user 10. Depicted in FIG. 11 is an example of a user interface that is displayed on the portable terminal 11 in the smart home system according to the embodiment of the present disclosure in a state in which the worker of a housekeeping service is present in the home 400. The smart home system according to the embodiment of the present disclosure may perform, in a state in which the worker of the housekeeping service is present in the home 400, such a display that an icon 401 indicative of the enterpriser of the housekeeping service is present in a house as depicted in FIG. 11.

Figure 12:
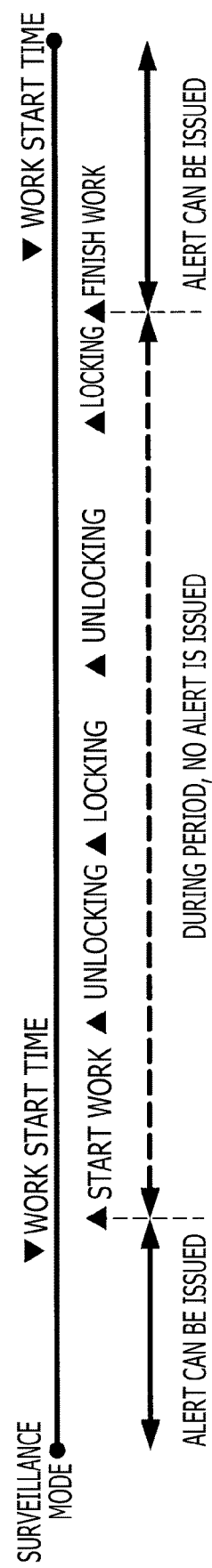
FIG. 12 is an explanatory view depicting an example of transition of the mode of the home 400 in the smart home system according to the embodiment of the present disclosure.

Now, the modes of the home 400 in the smart home system according to the embodiment of the present disclosure are described in an organized manner. FIG. 12 is an explanatory view depicting an example of transition of the mode of the home 400 in the smart home system according to the embodiment of the present disclosure.

Before the time when the worker of the housekeeping service starts working, the mode of the home 400 is the surveillance mode. In a state in which the mode of the home 400 is the surveillance mode, the indoor camera 460 executes the image capturing process. Accordingly, for example, if the smart lock 430 at the entrance is forced to open or if the open/close sensor 450 for a window detects that the window is opened and thus an abnormality is found in the home 400, then the alarm device installed in the inside of the home 400 issues an alert or the like to notify the surrounds that an abnormality occurs in the home 400.

When the work start time by the worker of the housekeeping service comes, the mode of the home 400 transitions from the surveillance mode to the working mode. Accordingly, after the worker of the housekeeping service starts working, even if the open/close sensor 450 for the window detects that the window is opened, the alarm device does not issue an alert. Further, during the working mode, even if locking or unlocking of the smart lock 430 is performed, the alarm device does not issue an alert similarly. On the other hand, the indoor camera 460 still continues executing the image capturing process even while the mode of the home 400 is the working mode.

When the worker of the housekeeping service finishes working, the mode of the home 400 transitions from the working mode back to the surveillance mode. After the mode of the home 400 becomes the surveillance mode, when an abnormality occurs in the home 400, the alarm device installed in the inside of the home 400 issues an alert as described above.

Now, described is an example of a user interface for allowing an enterpriser of a housekeeping service to register a visit schedule of a worker or request for unlocking or locking when the worker visits the home in which the worker is to perform work.

FIG. 13 is an explanatory view depicting an example of a user interface. Depicted in FIG. 13 is an example of a user interface for displaying a visit schedule of a worker of a housekeeping service and requesting for unlocking and locking. The user interface is, for example, a user interface that is displayed when an operator of the housekeeping service accesses the enterpriser server 200.

If predetermined search conditions are inputted to an input area for search conditions and a search button is depressed, then visit schedules that satisfy the search conditions are displayed in the form of a list in a display area for a search result. In addition, when a worker arrives at the entrance of a home in which the worker is to perform work, and then issues a request for unlocking of the smart lock 430, the operator depresses an unlocking button in a row of the applicable visit schedule.

Figure 14:
FIG. 14 is an explanatory view depicting an example of a user interface.

FIG. 14 is an explanatory view depicting an example of a user interface. Depicted in FIG. 14 is an example of a user interface displayed when the unlocking button is depressed on the screen depicted in FIG. 13. Here, when an OK button is depressed by the operator, a request to unlock the smart lock 430 is transmitted to the system server 100. When the unlocking is performed normally, a user interface representing that the smart lock 430 is unlocked is displayed.

Figure 15:
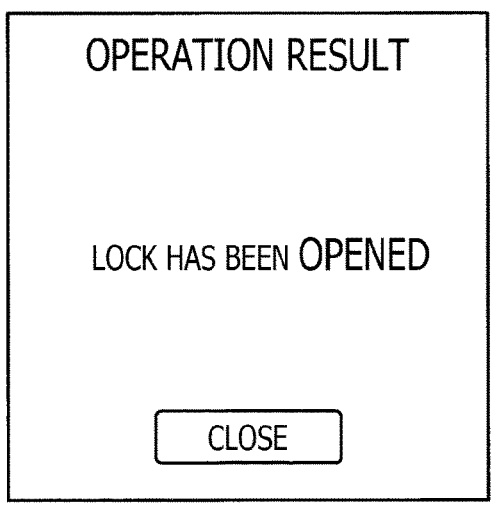
FIG. 15 is an explanatory view depicting an example of a user interface.

FIG. 15 is an explanatory view depicting an example of a user interface. Depicted in FIG. 15 is an example of a user interface displayed when the smart lock 430 is unlocked normally. It is to be noted that, in a case where an unlocking request is transmitted in a state in which unlocking is already completed or in which the smart lock 430 is unlocked for some reason, a message representing that the lock is already opened may be displayed on the user interface depicted in FIG. 15.

On the other hand, when the worker finishes the work and issues a request for locking of the smart lock 430, the operator depresses a locking button on the row of the applicable visit schedule.

Figure 16:
FIG. 16 is an explanatory view depicting an example of a user interface.

FIG. 16 is an explanatory view depicting an example of a user interface. Depicted in FIG. 16 is an example of a user interface displayed when the locking button is depressed on the screen depicted in FIG. 13. Here, when the OK button is depressed by the operator, a request to lock the smart lock 430 is transmitted to the system server 100. When the locking is performed normally, a user interface representing that the smart lock 430 is locked is displayed.

Figure 17:
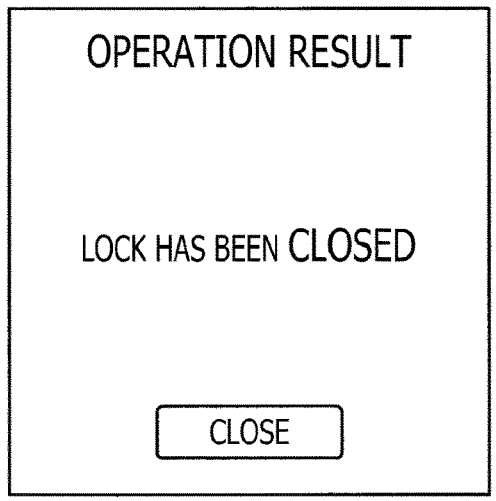
FIG. 17 is an explanatory view depicting an example of a user interface.

FIG. 17 is an explanatory view depicting an example of a user interface. Depicted in FIG. 17 is an example of a user interface displayed when the smart lock 430 is locked normally. It is to be noted that, in a case where a locking request is transmitted in a state in which locking is already completed or in which the smart lock 430 is unlocked for some reason, a message representing that the lock is already closed may be displayed on the user interface depicted in FIG. 17.

When the worker arrives at the home 400 and is to start working, the operator depresses the start button on the row of the applicable visit schedule. When the start button is depressed, the unlocking button, the locking button, the check button, and the work end button on the same row are enabled to be depressed.

Figure 18:
FIG. 18 is an explanatory view depicting an example of a user interface.

FIG. 18 is an explanatory view depicting an example of a user interface. Depicted in FIG. 18 is an example of a user interface displayed when the start button is depressed on the screen depicted in FIG. 13. When the start button is depressed, the name of a client and a message representing that the work in the home of the client is to be started are displayed as depicted in FIG. 18. Here, when the OK button is depressed by the operator, the unlocking button, the locking button, the check button, and the work end button on the same row are enabled to be depressed. Further, when the OK button is depressed by the operator, such a display that an icon indicative of the enterpriser of the housekeeping service is placed in a house is displayed on the portable terminal 11 as depicted in FIG. 11.

Figure 19:
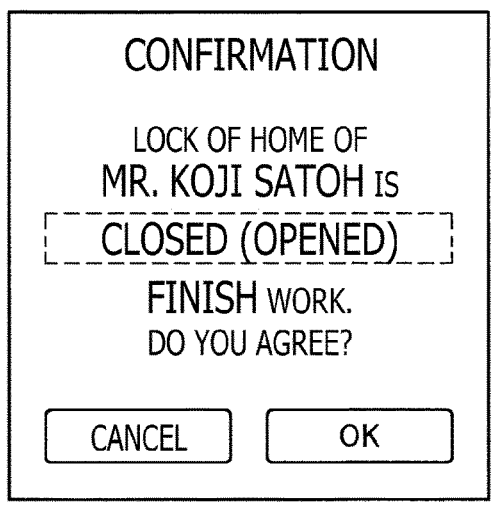
FIG. 19 is an explanatory view depicting an example of a user interface.

FIG. 19 is an explanatory view depicting an example of a user interface. Depicted in FIG. 19 is an example of a user interface displayed when the end button is depressed on the screen depicted in FIG. 13. When the end button is depressed, the name of the client, a state of the smart lock 430 of the client, and a message representing that the work in the home of the client is to be finished are displayed as depicted in FIG. 19. The state of the smart lock 430 of the client may be displayed only before the work end time.

Figure 20:
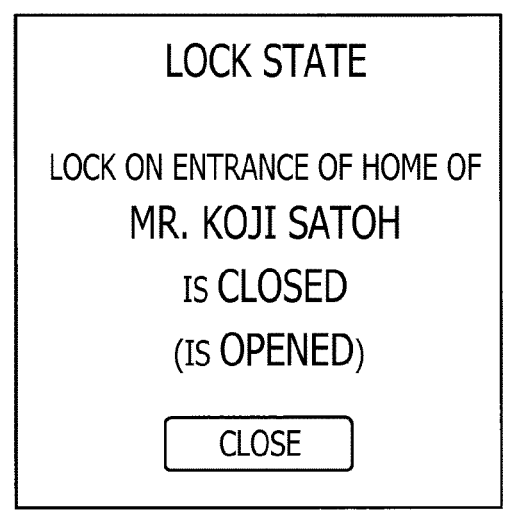
FIG. 20 is an explanatory view depicting an example of a user interface.

FIG. 20 is an explanatory view depicting an example of a user interface. Depicted in FIG. 20 is an example of a user interface displayed when the OK button is depressed on the screen depicted in FIG. 19. When the OK button is depressed on the screen depicted in FIG. 19, a message indicative of a state of the smart lock 430 of the client can be displayed as depicted in FIG. 20.

Further, when the OK button is depressed on the screen depicted in FIG. 19, a user interface is displayed on the portable terminal 11 in a state in which the icon indicative of the enterpriser of the housekeeping service is removed.

The smart home system according to the present embodiment provides a user interface for allowing the operator of the enterpriser of a housekeeping service to change a visit schedule of a worker who is to visit the home 400.

FIG. 21 is an explanatory view depicting an example of a user interface. Depicted in FIG. 21 is an example of a user interface for allowing the operator of the enterpriser of the housekeeping service to change a visit schedule of a worker who is to visit the home 400. The user interface depicted in FIG. 21 is an example of a user interface that is displayed in a case where an edit button in a schedule edit column on the user interface depicted in FIG. 13 is selected by the operator.

The operator of the enterpriser of the housekeeping service can change the visit schedule of the worker who is to visit the home 400, by operating such a user interface as depicted in FIG. 21.

The smart home system according to the present embodiment provides a user interface for allowing the operator of the enterpriser of the housekeeping service to register a visit schedule of a worker who is to visit the home 400.

FIG. 22 is an explanatory view depicting an example of a user interface. Depicted in FIG. 22 is an example of a user interface for allowing the operator of the enterpriser of the housekeeping service to register a visit schedule of a worker who is to visit the home 400. The user interface depicted in FIG. 22 is an example of a user interface that is displayed in a case where a schedule registration button is selected by the operator on the user interface depicted in FIG. 13.

The operator of the enterpriser of the housekeeping service can register a visit schedule of a worker who is to visit the home 400, by operating such a user interface as depicted in FIG. 22.

2. Summary

As described above, according to the embodiment of the present disclosure, provided are the smart home system that does not determine a person who is neither a family member nor a suspicious person, such as a worker of a housekeeping service, as a suspicious person and as a surveillance target but determines such a person as a monitoring target to some degree, and the system server 100 that operates in the smart home system.

The respective steps in processing executed by each device in the present specification may not necessarily be processed in time series according to an order described as a sequence diagram or a flow chart. For example, the respective steps in processing executed by each device may be processed in an order different from the order described as a flow chart or may be processed in parallel.

In addition, it is possible to create a computer program that causes hardware built in each device, such as a CPU, a ROM, and a RAM, to demonstrate a function equivalent to the configuration of each device described above. Further, it is possible to provide a storage medium that stores the computer program. It is also possible to implement a series of processes by hardware, by configuring respective functional blocks depicted in the functional block diagrams with hardware.

While the preferred embodiment of the present disclosure has been described in detail above with reference to the accompanying drawings, the technical scope of the present disclosure is not restricted to such an example as just described. It is apparent that those who have common knowledge in the technical field of the present disclosure can conceive various alterations or modifications within the scope of the technical idea described in the claims, and it is also construed that such alterations or modifications naturally fall within the technical scope of the present disclosure.

For example, while the indoor camera 460 is given as an example of the image capturing device installed in the home 400 in the embodiment described above, a camera that captures not only an image of the inside of a room but also an image of the surroundings of a house such as an entrance or a garden may be provided as the image capturing device installed in the home 400.

Further, the advantageous effects described in the present specification are merely explanatory or exemplary and are not restrictive. Specifically, the technology according to the present disclosure can demonstrate other advantageous effects that are apparent to those skilled in the art from the description of the present specification, together with the advantageous effects described above or in place of the advantageous effects described above.

It is to be noted that such configurations as described below also belong to the technical scope of the present disclosure.

(1)

An equipment controlling apparatus including:

a storage section that stores a time frame within which a setting of operation of a device disposed in a predetermined region is to be changed; and a control section that controls the device to change operation between a time frame set in advance in the storage section and a time frame different from the time frame.

(2)

The equipment controlling apparatus according to (1) above, in which the control section controls the device to change operation by using, as a trigger, a start of work of a worker in the predetermined region within the time frame set in advance in the storage section.

(3)

The equipment controlling apparatus according to (2) above, in which the device includes a lock for an entrance that is configured so as to be locked and unlocked remotely, and the control section excludes the lock from a monitoring target while the worker is working in the predetermined region.

(4)

The equipment controlling apparatus according to (2) or (3) above, in which the device includes an image capturing device that captures an image of an inside or surroundings of the predetermined region, and the control section controls the image capturing device to continue an image capturing process while the worker is working in the predetermined region.

(5)

The equipment controlling apparatus according to (4) above, in which the control section controls the image capturing device to stop the image capturing process in a state in which a client who has requested the worker to work is present in the predetermined region.

(6)

The equipment controlling apparatus according to any one of (2) to (5) above, in which the device includes an open/close sensor that detects opening and closing of a window or a door in a room, and the control section excludes the opening and closing of the window detected by the open/close sensor, from the monitoring target while the worker is working in the predetermined region.

(7)

The equipment controlling apparatus according to any one of (2) to (6) above, in which the control section determines, as the monitoring target, presence or absence of an entry into a partial region in the predetermined region that is designated so as not to enter by the client who has requested the worker to work.

(8)

The equipment controlling apparatus according to any one of (2) to (7) above, in which
the device includes the lock for the entrance that is configured so as to be locked and unlocked remotely, and
the control section performs control so as to confirm whether a state in which remote locking and unlocking of the lock are available is established before the time frame set in advance in the storage section.

(9)

The equipment controlling apparatus according to any one of (2) to (7) above, in which
the device includes the lock for the entrance that is configured so as to be locked and unlocked remotely, and
the control section executes remote locking and unlocking of the lock on the basis of a request from a manager who is determined in advance and who manages the worker.

(10)

The equipment controlling apparatus according to any one of (1) to (9) above, in which the control section controls the device to change operation by using, as a trigger, an end of work of the worker in the predetermined region within the time frame set in advance in the storage section.

(11)

The equipment controlling apparatus according to any one of (1) to (10) above, in which the predetermined region includes a home.

(12)

An equipment controlling method including:
allowing storage of a time frame within which a setting of operation of a device disposed in a predetermined region is to be changed; and
controlling the device to change operation between a time frame set in advance in the storage section and a time frame different from the time frame.

(13)

A computer program causing a computer to execute:
allowing storage of a time frame within which a setting of operation of a device disposed in a predetermined region is to be changed; and
controlling the device to change operation between a time frame set in advance in the storage section and a time frame different from the time frame.

REFERENCE SIGNS LIST

100: System server
200: Enterpriser server
300: Smart server

The invention claimed is:

1. An equipment controlling apparatus, comprising:
a storage section configured to store a first time frame within which a setting of an operation of a device disposed in a predetermined region is to be changed; and
a control section configured to control the device to change the operation between the first time frame set in advance in the storage section and a second time frame different from the first time frame.

2. The equipment controlling apparatus according to claim 1, wherein the control section is further configured to control the device to change the operation by using, as a trigger, a start of work of a worker in the predetermined region within the first time frame set in advance in the storage section.

3. The equipment controlling apparatus according to claim 2, wherein
the device includes a lock for an entrance that is configured so as to be locked and unlocked remotely, and
the control section excludes the lock from a monitoring target while the worker is working in the predetermined region.

4. The equipment controlling apparatus according to claim 2, wherein
the device includes an image capturing device that captures an image of an inside or surroundings of the predetermined region, and
the control section is further configured to control the image capturing device to continue an image capturing process while the worker is working in the predetermined region.

5. The equipment controlling apparatus according to claim 4, wherein the control section is further configured to control the image capturing device to stop the image capturing process in a state in which a client who has requested the worker to work is present in the predetermined region.

6. The equipment controlling apparatus according to claim 2, wherein
the device includes an open/close sensor that detects opening and closing of a window or a door in a room, and
the control section excludes the opening and closing of the window detected by the open/close sensor, from a monitoring target while the worker is working in the predetermined region.

7. The equipment controlling apparatus according to claim 2, wherein the control section is further configured to determine, as a monitoring target, presence or absence of an entry into a partial region in the predetermined region that is designated so as not to enter by a client who has requested the worker to work.

8. The equipment controlling apparatus according to claim 2, wherein
the device includes a lock for an entrance that is configured so as to be locked and unlocked remotely, and
the control section is further configured to control so as to confirm whether a state in which remote locking and unlocking of the lock are available is established before the first time frame set in advance in the storage section.

9. The equipment controlling apparatus according to claim 2, wherein
the device includes a lock for an entrance that is configured so as to be locked and unlocked remotely, and
the control section is further configured to execute remote locking and unlocking of the lock based on a request from a manager who is determined in advance and who manages the worker.

10. The equipment controlling apparatus according to claim 1, wherein the control section is further configured to control the device to change the operation by using, as a trigger, an end of work of a worker in the predetermined region within the first time frame set in advance in the storage section.

11. The equipment controlling apparatus according to claim 1, wherein the predetermined region includes a home.

12. An equipment controlling method comprising:
allowing storage of a first time frame within which a setting of an operation of a device disposed in a predetermined region is to be changed; and
controlling the device to change the operation between the first time frame set in advance in a storage section and a second time frame different from the time frame.

13. A non-transitory computer-reachable medium having stored thereon, computer-executable instructions which, when executed by a computer, cause the computer to execute operations, the operations commmprising:
    allowing storage of a first time frame within which a setting of an operation of a device disposed in a predetermined region is to be changed; and
    controlling the device to change the operation between the first time frame set in advance in a storage section and a second time frame different from the first time frame.

* * * * *